(12) United States Patent
Tay et al.

(10) Patent No.: US 7,393,452 B2
(45) Date of Patent: Jul. 1, 2008

(54) COMPOSITIONS AND METHODS FOR THE TREATMENT OF WASTEWATER AND OTHER WASTE

(75) Inventors: Joo Hwa Tay, Singapore (SG); Stephen Tiong Lee Tay, Singapore (SG); Volodymyr Ivanov, Singapore (SG); Olena Stabnikova, Singapore (SG); Jing-Yuan Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 158 days.

(21) Appl. No.: 10/511,526

(22) PCT Filed: Apr. 11, 2003

(86) PCT No.: PCT/SG03/00079

§ 371 (c)(1),
(2), (4) Date: Apr. 15, 2005

(87) PCT Pub. No.: WO03/093179

PCT Pub. Date: Nov. 13, 2003

(65) Prior Publication Data

US 2006/0163154 A1  Jul. 27, 2006

(30) Foreign Application Priority Data

Apr. 16, 2002  (SG) .............................. 200202196-2

(51) Int. Cl.
*C02F 3/30* (2006.01)
*C02F 3/34* (2006.01)

(52) U.S. Cl. .................. 210/601; 210/605; 210/630; 210/631; 210/903; 210/904; 210/905; 210/906; 210/909; 435/262.5

(58) Field of Classification Search .............. 210/603, 210/605, 610, 611, 630, 631, 903–907, 909, 210/912, 601; 435/262, 262.5
See application file for complete search history.

(56) References Cited

U.S. PATENT DOCUMENTS 4,880,740 A * 11/1989 Hoffmann et al. ........... 435/168

(Continued)

FOREIGN PATENT DOCUMENTS

EP  0301924 A2  2/1989

(Continued)

OTHER PUBLICATIONS

International Search Report dated Jul. 3, 2003.

*Primary Examiner*—Fred Prince
(74) *Attorney, Agent, or Firm*—Crowell & Moring LLP

(57) ABSTRACT

A method for processing environmental samples to remove or otherwise reduce the level of certain chemical species. In a preferred embodiment, the present invention contemplates a process for reducing the level of inorganic and/or organic chemical species in wastewater or other aqueous or semi-aqueous environments or other waste environments. The present invention further provides compositions of bacteria useful in modulating the redox potential of an environment to generate redox mediator species which facilitate the removal of particular inorganic or organic molecules from the environment or from samples therefrom. The redox potential is preferably modulated through microbial-mediated oxidation or reduction of metal cations under aerobic or anaerobic conditions, respectively. The present invention is further directed to a computer program which facilitates the controlled modulation of the redox potential of an aqueous or semi-aqueous environment or other environments.

24 Claims, 3 Drawing Sheets

U.S. PATENT DOCUMENTS

| | | | | |
|---|---|---|---|---|
| 5,514,278 | A | * | 5/1996 | Khudenko .................. 210/605 |
| 5,543,049 | A | * | 8/1996 | Hogen et al. ................ 210/601 |
| 5,569,596 | A | * | 10/1996 | Caccavo et al. ............. 435/168 |
| 5,616,241 | A | * | 4/1997 | Khudenko .................. 210/151 |
| 5,919,367 | A | * | 7/1999 | Khudenko .................. 210/605 |
| 6,465,706 | B1 | * | 10/2002 | Rogers et al. ................. 588/1 |

FOREIGN PATENT DOCUMENTS

| | | | |
|---|---|---|---|
| JP | 52130150 A | | 11/1977 |
| JP | 57-190696 | * | 11/1982 |
| JP | 58-34092 | * | 2/1983 |
| SU | 916441 | * | 3/1982 |
| WO | WO 98/49106 A1 | | 11/1998 |

\* cited by examiner

COMPOSITIONS AND METHODS FOR THE TREATMENT OF WASTEWATER AND OTHER WASTE

FIELD OF THE INVENTION

The present invention relates generally to a method for processing of samples or particular locations to remove or otherwise reduce the level of certain chemical species. In a preferred embodiment, the present invention contemplates a process for reducing the level of inorganic and/or organic chemical species in wastewater or other aqueous or semi-aqueous environments or other waste environments. The present invention further provides compositions of bacteria useful in modulating the redox potential of an environment by generating redox mediator species which facilitate the removal of particular inorganic or organic molecules from the environment or from samples therefrom. The redox potential is preferably modulated through microbial-mediated oxidation or reduction of metal cations under aerobic or anaerobic conditions, respectively. The present invention is further directed to a computer program which facilitates the controlled modulation of the redox potential of an aqueous or semi-aqueous environment or other environments.

BACKGROUND OF THE INVENTION

Reference to any prior art in this specification is not, and should not be taken as, an acknowledgment or any form of suggestion that this prior art forms part of the common general knowledge in Singapore or any other country.

Combined anaerobic and aerobic treatment of wastewater, surface water, ground water, solid waste and polluted soil is one method for the removal of organic matter. Such treatments exploit the advantages of both aerobic and anaerobic degradative processing. The main advantages of anaerobic treatment include the low production of biomass (sludge) and the lack of costly aeration processes which are essential in aerobic treatment steps. The advantages of aerobic treatment include the high rates of degradation of organic matter as well as the degradation of materials which cannot be broken down by anaerobic treatment processes.

Combined anaerobic-aerobic treatment processes, also known as cycled or sequential treatments, ensure more effective degradation of organic matter compared to separate anaerobic or aerobic processes. These systems are far from ideal, however, as bacterial-mediated removal or bio-removal of certain substances is insufficient in even state-of-the-art cycled systems. For example, lipids, which are common components of municipal and food-processing wastewater, and solid food waste, are poorly degraded under both anaerobic and aerobic conditions. These lipids form long-chain fatty acids (LCFAs) which are inhibitors of anaerobic digestion by virtue of their surface-active (surfactant) properties. In addition, LCFAs promote the formation of foam in aerobic systems. Foaming can hinder fluid movement and can change the surface tension of the aqueous environment to an extent which can inhibit bacterial growth. Organic acids, particularly aromatic organic acids such as salicylic acid, affect biodegradation in a similar manner to LCFAs.

Bioremoval systems are also unable to break down sulfate, which is a common chemical species in municipal, industrial and food-processing waste. Anaerobically mediated transformation of sulfate yields dihydrogen sulfide, which is a powerful toxin and an inhibitor of further anaerobic digestion. This inhibition can culminate in bulking problems within activated sludge in the subsequent aerobic treatment of effluent from anaerobic reactors. This bulking prevents sedimentation of the sludge, disrupting the normal performance of wastewater-treatment plants.

Yet another problematic chemical species for bio-removal systems is ammonium, which is present in municipal, food-processing, aquacultural, agricultural, and several kinds of industrial wastewater, domestic wastewater, surface water, and ground water. Ammonium can be aerobically oxidized to nitrate by nitrifying bacteria, but the concentrations and growth rates of nitrifying bacteria in aerobic sludge is low, hence, the removal of ammonium from wastewater is usually insufficient. Effluent containing ammonium is a particularly potent aquatic contaminant.

Other contaminants of wastewater which have the potential for causing environmental problems include phosphates, thiocyanates, cyanide, organic acids, phenolic compounds, polyaromatic hydroxylated compounds, heavy metals, and radionuclides. These substances are present in wastewater and solid wastes from many sources, but bioremoval systems are either unable to remove these substances or removal occurs at an insufficient level.

Technologies using iron for the chemical removal of these contaminants have been extensively investigated due to the capacity of iron to remove a wide range of common wastewater contaminants. However, most currently available technologies for these chemical treatment processes are not economically viable in the scale required for wastewater treatment.

In one proposal, for example, hydrocarbon and heavy metal ion contaminants were proposed to be removed from wastewater by the introduction of iron ions into the wastewater (U.S. Pat. No. 6,096,222). In this proposal, the iron ions were introduced by applying an electrical current through a bed of iron particulates in the form of steel wool and iron nodules. This method has the disadvantage of requiring the use of expensive iron salts and an electrochemical unit to produce iron ions.

Electrolytic production of ferrous ions and further mixing with wastewater for the production of iron hydroxide as active adsorbent of impurities was proposed in U.S. Pat. No. 4,880,510. A similar approach, involving the production of Fe(II) from Fe(III) by electrolytic reduction and further use of ferrous ions for the formation of iron hydroxide and extensive purification of wastewater, was proposed in U.S. Pat. No. 6,126,838.

In U.S. Pat. No. 5,993,667, selenium was proposed to be removed from wastewater by adsorption and further precipitation on iron hydroxide particles. The wastewater was proposed to be treated by iron salts such as ferric sulfate or ferric chloride to produce the particles of iron hydroxide. In addition to selenium, many other heavy metals may be removed by a similar approach as described in U.S. Pat. No. 5,651,895. This method includes addition of iron salt to heavy-metals containing wastewater from contaminated soil or sediment. A base is then added to increase the pH to a level from about 8 to 10. As the base is added, a precipitate comprising contaminants forms and is then removed by standard filtration techniques. Heavy metals co-precipitate with the iron and are removed by filtration. The disadvantage of these methods is the use of expensive salts and necessity to control pH automatically.

A method of controlling anaerobic wastewater treatment by iron ions was proposed in U.S. Pat. No. 5,798,043. The iron ions were proposed to be added in the treatment system. Iron forms insoluble and soluble carbonates that maintain the carbonic acid equilibrium and pH in anaerobic process. However, the disadvantage of this method is that the sources of iron salts are too expensive to be used in wastewater treatment.

The employment of iron's waste-removal properties has also been limited by issues relating to the solubility and redox state of iron and iron hydroxide ions at the neutral or near-neutral pH of wastewater as well as the expense of suitable varieties of iron salts or iron hydroxides. Only ferrous iron (iron II) is soluble under neutral pH, and this form of iron is rapidly oxidized to ferric iron (iron III) under aerobic conditions at this pH. Under anaerobic conditions, iron(III) can be reduced to iron(II) by anaerobic iron-reducing bacteria. Such bacteria couple the oxidation of hydrogen or organic substrates to the reduction of iron(III) (Lorley et al., *Ann. Rev. Microbiol.* 47: 263-290, 1993; Nealson and Saffarini, *Ann. Rev. Microbiol.* 48: 311-343, 1994). Most of iron(III) salts are hydrolized at neutral pH forming the precipitate of ferric hydroxides. However, solubility of Fe(II) and Fe(III) at neutral pH or near neutral pH can be improved significantly due to the formation of their chelates with organic acids.

Commercially available salts of iron(III) and iron(II) are too expensive for large-scale wastewater treatment. Although there are many cheap sources of iron, such as iron ores or iron-containing clay, the iron in these products is mainly insoluble ferric iron.

The present inventors have now developed a new approach which enables the use of various sources of metals in the treatment of aqueous and other waste environments.

SUMMARY OF THE INVENTION

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

The present invention relates generally to the manipulation of the redox potential of an aqueous or semi-aqueous environment or other environments or samples therefrom in order to facilitate removal of or to promote a reduction in the level of one or more types of chemical species. More particularly, the present invention relates generally to the use of oxidation and reduction steps to modify the valence states of metals to create redox mediators which facilitate the removal of particular chemical species from wastewater and/or other forms of waste. Such oxidation and reduction steps can occur sequentially, in any order, concurrently and/or in a cyclic manner. The ability of a sample or an environment to be manipulated to after its redox state is encompassed by the general term "redox potential" of the particular waste sample.

In particular, the present invention relates to the manipulation of the redox potential of one or more redox mediator species wherein the redox mediator species directly or indirectly induces, enables, expedites or otherwise promotes the removal of one or more chemical species from wastewater and/or other forms of waste.

Even more particularly, the present invention relates to a composition comprising microorganisms having sufficient metabolic capacity to induce a change in redox potential of redox mediator species in a sample which then mediates chemical or physical alterations in one or more chemical species in wastewater and/or other waste products. In a particular embodiment, one of the bioredox microorganisms is an anaerobic, metal-reducing bacterial strain and the redox mediator species is a cationic metal. The anaerobic metal-reducing bacteria are delivered in an enriched or purified form suspended in a low-oxygen micro-environment within a composition containing the redox mediator species. In another embodiment, the bioredox microorganism is an aerobic or facultative anaerobic metal-oxidizing bacterium.

In an alternative embodiment, the growth of microorganisms indigenous to the wastewater or other waste is promoted. The present invention further contemplates a method for the removal of particular chemical species from wastewater and/or other waste products using microorganisms and a redox mediator species wherein the microorganisms are encapsulated within a composition containing the redox mediator species.

The present invention further provides a composition and method for anaerobic or aerobic or combined anaerobic-aerobic biological treatment of wastewater or other waste or a sample thereof. The wastewater or other waste to be treated may derive from sources which include industrial, municipal, domestic food-processing, aquacultural and agricultural uses. The wastewater or other waste may be treated for a range of contaminants that include ammonium, phosphate, lipids, proteins, nucleic acids, organic acids, sulfate, cyanide, heavy metals and radionuclides. In a preferred embodiment, the method involves the use of sequential or cycled processes of the anaerobic reduction of iron(III) and the aerobic oxidation of iron(II) in wastewater treatment. Iron(III) in iron-containing clay minerals or crushed iron ores is reduced in anaerobic treatment by iron-reducing bacteria. The granules or suspension of iron-reducing bacteria mixed with clay to protect them from oxygen may be added as the composition to diminish start-up period and to enhance the anaerobic treatment. Soluble iron(II) produced by these bacteria precipitates long chain fatty acids released from lipids, hydrogen sulfide produced from sulfate, ammonium released from proteins and nucleic acids, organic acids, phosphate and cyanide. Effluent from anaerobic treatment together with soluble Fe(II) produced by iron-reducing bacteria are oxidized during aerobic treatment. Iron(III) hydroxide produced by iron-oxidizing bacteria during aerobic treatment precipitates ammonium, phosphate, organic acids, heavy metals and radionuclides. The granules or suspension of iron-oxidizing bacteria may be added as the composition to diminish start-up period and to enhance the aerobic treatment. The invention improves the performance of biological wastewater treatment and quality of the effluent.

The precipitate of iron hydroxides produced in such treatments of food-processing, municipal, agricultural, or other type of the wastes is enriched by ammonium, phosphate, potassium, and other nutrients and can be used as fertilizer. Thus, the present invention not only improves the treatment of the wastes, but also creates a value-added product and promotes the recycling of the nutrients in the environment.

The present invention further provides computer software useful in controlling the sequential and/or cycled waste treatment processes of the present invention.

DETAILED DESCRIPTION OF THE PREFERRED EMBODIMENTS

Figure 1:
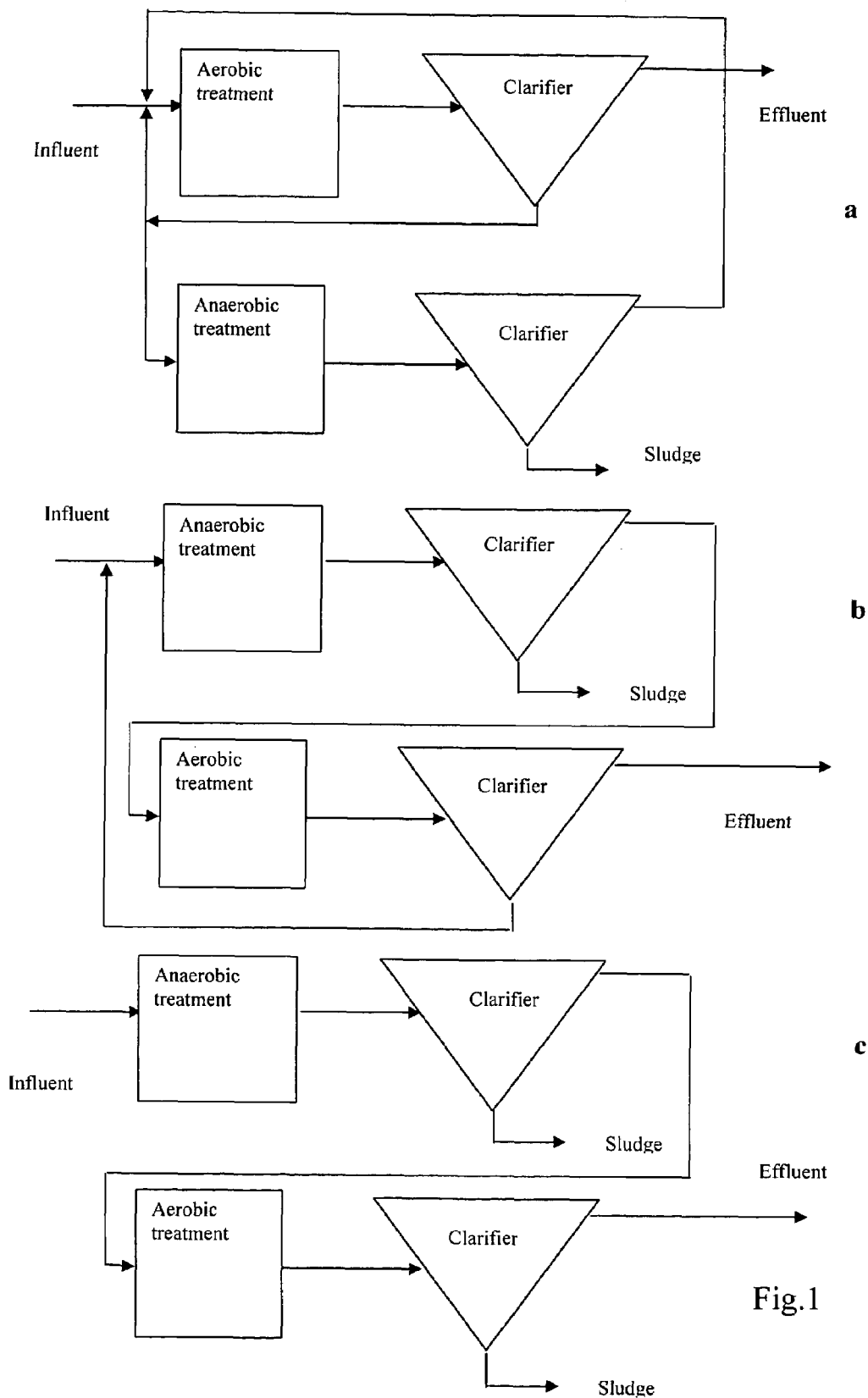
FIG. 1 contains schematic representations of wastewater treatment systems. (a) represents a conventional cycled aerobic-anaerobic system; (b) represents a cycled anaerobic-aerobic system and (c) represents a sequential anaerobic-aerobic wastewater treatment system.

The present invention contemplates a method for removing or otherwise reducing the level of certain chemical species in a sample, said method comprising subjecting said sample to one or both of anaerobic treatment conditions and/or aerobic treatment conditions wherein the valency of one or more redox mediator species is manipulated by microorganisms resulting in precipitation, aggregation or flocculation of the chemical species.

More particularly, the present invention contemplates a method for removing or otherwise reducing the level of certain chemical species in a sample by physico-chemical means, said method comprising subjecting said sample to one or both of anaerobic treatment conditions and/or aerobic treatment conditions wherein the valency of one or more redox mediator species is manipulated by microorganisms wherein under anaerobic conditions, redox mediator species are reduced to a lower order valency and under aerobic conditions, redox mediator species are oxidized to a higher order valency by microorganisms and this in turn facilitates the formation of insoluble particles comprising particular chemical species.

Reference to a "chemical species" includes one or more than one chemical entity and encompasses inorganic and organic molecules. The term "contaminants" is also encompassed by the expression "chemical species". Examples of chemical species contemplated herein include proteins, fatty acids, lipids, ammonium, nucleic acids, organic acids, phenolic compounds, aromatic polynuclear hydroxylated compounds, phosphates, cyanide, heavy metals, sulfate, radionuclides, amongst others. A protein includes a polypeptide and a peptide.

The term "sample" as used herein includes any liquid, semi-liquid, solid, particulate or gaseous form of waste material which may be derived from applications that include inter alia agricultural, municipal, food processing, industrial and aquacultural processes or combinations thereof. Accordingly, the samples may be environmental, industrial or domestic. A sample may also be a region or defined or partially defined region of an environment. Wastewater is one example of a sample. The term "wastewater" includes any aqueous environment carrying undesired chemical species including by-products of environmental, industrial or domestic processes. Generally, the wastewater contains chemical species such as those listed above including inorganic and organic contaminants. Although the technology of the present invention relates to by-products in a liquid form, it is well-known in the art that gaseous pollutants can be converted into a liquid suspension and solid materials can be converted into slurries with water or any other suitable solvent.

The present invention is particularly directed to wastewater although extends to other environments such as surface water, ground water, solid waste and/or polluted soil.

Accordingly, in a preferred embodiment the present invention contemplates a method for removing or otherwise reducing the level of inorganic and/or organic chemical species in wastewater, surface water, ground water, solid waste, and/or polluted soil said method comprising subjecting said wastewater, surface water, ground water, solid waste, and/or polluted soil to one or both of anaerobic treatment conditions and/or aerobic treatment conditions wherein the valency of one or more redox mediator species is manipulated by microorganisms resulting in precipitation, aggregation or flocculation of the chemical species.

More particularly, the present invention contemplates a method for removing or otherwise reducing the level of inorganic and/or organic chemical species in wastewater by physico-chemical means, said method comprising subjecting said wastewater to one or both of anaerobic treatment conditions and/or aerobic treatment conditions wherein the valency of one or more redox mediator species is manipulated by microorganisms where under anaerobic conditions, redox mediator species are reduced to a lower order valency and under aerobic conditions, redox mediator species are oxidized to a higher order valency by microorganisms and this in turn facilitates the formation of insoluble particles of another contaminant or contaminants.

The term "contaminant" as used herein means any type of organic or inorganic element or compound whose presence, chemical form and/or concentration within the sample needs to be altered by removal, reduction in concentration and/or chemical modification. The contaminant may or may not be toxic, malodorous, pathogenic or otherwise non-beneficial for the health of a vertebrate organism and may include but is not limited to ammonium, heavy metals, sulfates, cyanides, phosphate, radionuclides, long-chain fatty acids, short-chain fatty acids, aromatic compounds, organic acids, cyanide or phenolic compounds.

Generally, a contaminant is a chemical species whose presence above a certain concentration is undesired.

Generally, the chemical species are removed by physio-chemical means.

The term "physico-chemical means" as used herein means the use of a chemical reagent such as but not limited to a mineral reagent which is added to a sample in order to promote chemical and/or physical processes such as chemical conversion, precipitation, coagulation and/or flocculation of suspended and/or dissolved organic and/or inorganic particulate matter. The chemical and physical processes enabled by the chemical reagent may involve the formation of large particles from smaller suspended and/or dissolved contaminants which then settle or otherwise precipitate, aggregate or flocculate. The physical processes such as flocculation and coagulation may or may not be aided mechanically by means such as gentle stirring of the sample in order to enhance the interaction of small particles and promote the formation of larger particles which settle faster. A settling step in which precipitated, aggregated or flocculated material is allowed to settle such as in a settling tank is particularly useful in the practice of the present invention.

The present invention contemplates, therefore, a method for removing or otherwise reducing the level of inorganic and/or organic chemical species in wastewater by physico-chemical means, said method comprising subjecting said wastewater to one or both of anaerobic treatment conditions and/or aerobic treatment conditions wherein the valency of one or more redox mediator species is manipulated by microorganisms where under anaerobic conditions, redox mediator species are reduced to a lower order valency and under aerobic conditions, redox mediator species are oxidized to a higher order valency by microorganisms and this in turn facilitates the formation of insoluble particles of another contaminant or contaminants wherein said insoluble particles are removed by the sample being maintained in a settling tank.

The term "redox mediator species" is used herein to describe an atomic or elemental composition with a variable oxidation state. Suitable redox mediator species include but are not limited to the group comprising zero valence metal pieces, metallic ions, metal-containing oxy ions, non-biodegradable and insoluble inorganic constituents with variable oxidation-reduction states and combinations thereof. The metallic and metal-containing species include metals selected from the group comprising iron, nickel, cobalt, manganese, vanadium and combinations thereof. Ion exchange resins (redox exchangers) with oxidation-reduction groups and similarly activated and modified natural organic and inorganic materials known in the art are also included in the term redox mediator species.

Preferably, the redox mediator species of the present invention is cationic iron which may be provided as iron salts, iron slurry, etc.

Accordingly, in a particularly preferred embodiment, the present invention contemplates a method for removing or otherwise reducing the level of inorganic and/or organic chemical species in wastewater, surface water, ground water, solid waste, and/or polluted soil such as by physico-chemical means, said method comprising subjecting said wastewater to one or both of anaerobic treatment conditions and/or aerobic treatment conditions wherein the valency of one or more cationic iron species is manipulated by microorganisms.

More particularly, the present invention contemplates a method for removing or otherwise reducing the level of inorganic and/or organic chemical species in wastewater such as by physico-chemical means, said method comprising subjecting said wastewater to one or both of anaerobic treatment conditions and/or aerobic treatment conditions wherein the valency of one or more cationic iron species is manipulated by microorganisms where under anaerobic conditions, cationic iron species are reduced to a lower order valency and under aerobic conditions, cationic iron species are oxidized to a higher order valency by microorganisms and this in turn facilitates the formation of insoluble particles of another contaminant or contaminants.

In yet another embodiment, the present invention contemplates a method for removing or otherwise reducing the level of organic and/or inorganic chemical species in wastewater, said method comprising subjecting said wastewater to one or both of anaerobic treatment conditions and/or aerobic treatment conditions wherein the manipulation of the valency cationic iron is manipulated by microorganisms wherein under anaerobic conditions, said cationic iron is reduced to the ferrous state and wherein under aerobic conditions, the oxidation of said cationic iron is oxidized to the ferric state by microorganisms which in turn facilitates the formation of insoluble particles comprising the chemical species.

The term "microorganisms" is used herein to describe organisms such as bacteria, yeast, protozoa and fungi, which are able to mediate an oxidation-reduction (redox) reaction by the transfer of electrons from an electron donor species to an electron acceptor species. The microorganisms may be regarded as "bioredox microorganisms".

The present invention is particularly directed to microorganisms which catalyze the alteration in redox potential of cationic iron. In a preferred embodiment, the bioredox microorganisms of the present invention are bacteria. Bacteria which transfer electrons to ferric iron and thus confer a lower order, ferrous valency are referred to herein as "iron-reducing bacteria" and, conversely, bacteria which mediate the removal of electrons from ferric iron and thus confer a higher order, ferric valency are referred to herein as "iron-oxidizing bacteria". The microorganisms may be naturally occurring or genetically modified. Naturally occurring microorganisms may be indigenous to the sample or may be maintained in a culture such as a starter culture. Genetically modified microorganisms may be mutated or manipulated by, for example, the introduction of genetic material such as a plasmid or vector.

Accordingly, another aspect of the present invention provides a method for removing or otherwise reducing the level of organic and/or inorganic contaminants in wastewater, said method comprising subjecting said wastewater to one or both of anaerobic treatment conditions and/or aerobic treatment conditions wherein the manipulation of the valency cationic iron is mediated by iron-reducing and/or iron-oxidizing bacteria wherein under anaerobic conditions, cationic iron is reduced to the ferrous state and under aerobic conditions, the cationic iron is oxidized to the ferric state by iron-oxidizing bacteria which in turn facilitates the formation of insoluble particles of the contaminants.

The removal or reduction in levels of contaminants may be complete or may be to a level which meets public health requirements.

The iron-reducing microorganisms of the present invention may include but are not limited to the following bacterial genera: *Acidobacterium, Aerobacter, Bacillus, Clostridium, Deferribacter, Desulfuromonas, Desulfuromusa, Esherichia, Ferribacterium, Ferrimonas, Geobacter, Geovibrio, Geothrix, Pantoea, Pseudomonas, Sulfurospirillum, Shewanella, Thermoterrabacterium, Thermotoga, Thermus* and/or mixed cultures of the aforementioned microorganisms, and/or enrichment cultures of the microorganisms capable to reduce iron (III).

The iron-oxidizing microorganisms of the present invention include but are not limited to the genera *Acidianus, Acidithiobacillus, Ferroglobus, Ferromicrobium, Gallionella, Hyphomicrobium, Leptothrix, Naumanniella, Ochrobium, Leptospirillum, Pedomicrobium, Rhodovulum, Rhodocyclus, Siderococcus, Sphaerotilus, Siderocapsa, Sulfolobus, Stenotrophomonas, Thiobacillus* and/or mixed cultures of the aforementioned microorganisms, and/or enrichment cultures of the microorganisms capable to oxidize iron (II).

The iron-reducing bacteria and/or iron-oxidizing bacteria of the present invention include bacterial species which have been mutated or selected so that the strains have enhanced iron reducing and/or iron-oxidizing properties.

In a further embodiment, in the anaerobic and/or aerobic phases of said treatment said sample is inoculated with a suitable amount of a pure or otherwise enriched culture of iron-reducing bacteria to diminish the start-up period of the processes involved in the treatment and subsequent removal of organic and/or inorganic contaminants in wastewater.

The term "suitable amount" as used herein means a quantity containing adequate numbers of iron-reducing and/or iron-oxidizing bacteria to alter the redox potential of sufficient cationic ion particles to a degree which expedites, accelerates or otherwise reduces the time required for initiation of the physico-chemical processes involved in the treatment of organic and/or inorganic contaminants in wastewater. The time required for initiation of the processes involved in the treatment of organic and/or inorganic contaminants in wastewater is referred to herein as the "the start-up period".

The anaerobic iron-reducing bacteria of the present invention may be delivered in a composition which contains the cationic iron (redox mediator species) wherein the composition is formulated in a manner which encapsulates, encloses or otherwise surrounds the anaerobic iron-reducing microorganisms in a form which reduces, abrogates or prevents the access of environmental oxygen to the microorganisms. The composition may also take the form of inter alia clay granules or a clay suspension or other forms of clay particles. The composition as described herein is encompassed by the term "protective anaerobic composition".

Furthermore, samples may already contain suitable types of iron-reducing and/or iron-oxidizing bacteria. The term "endogenous iron-related bacteria" as used herein refers to bacteria which are able to alter the valency of cationic iron and are members of a standard microorganism spectrum in a sample such as wastewater. Endogenous iron-related bacteria include endogenous iron-oxidizing bacteria and endogenous iron-reducing bacteria. Endogenous microorganisms also include indigenous microorganisms. The latter are microorganisms which are naturally present in the waste environment.

The present invention extends to methods for promoting, accelerating or otherwise expediting the growth of endogenous iron-related bacteria to achieve suitable amounts within a given sample. Such techniques for the promotion, acceleration or expedition of the growth of endogenous iron-related bacteria include inter alia the addition of growth substrates specific for endogenous iron-related bacteria, manipulation of the pH and/or temperature of the growth environment and targeted removal of competing or otherwise deleterious microorganisms by methods such as chemotherapeutic procedures.

More particularly, under anaerobic conditions, the growth of endogenous iron-reducing bacteria present in the wastewater may be promoted or enhanced to a suitable amount to reduce cationic iron to the ferrous state and facilitate the physico-chemical formation of insoluble particles of a particular chemical species. Similarly, under aerobic conditions, the growth of endogenous iron-oxidizing bacteria in the wastewater may be promoted or enhanced to a suitable amount to oxidize cationic iron to the ferric state and facilitate the physico-chemical formation of insoluble particles of other contaminants.

Compositions, reagents and microorganisms of the present invention may be provided separately or together in the form of kits such as starter kits containing lyophilized cultures of iron-reducing or iron-oxidizing bacteria.

For example, the iron-reducing or iron-oxidizing bacteria may be provided as a lyophilized culture within a container means which may or may not be supplied with the buffers, growth media and growth plates necessary for the culture of the bacteria, present in other container means. Reagents of the kit may be provided as liquid solutions, solids, semi-solids or powders. When the components are provided in a liquid solution, the liquid solution is an aqueous solution, with a sterile aqueous solution being particularly preferred. When reagents or components are provided as solid, semi-solids or powders, the component can be reconstituted by the addition of a suitable solvent. The solvent may or may not be provided in another container.

The container means of the kit may include at least one vial, ampule, test tube, flask, bottle, syringe or other container means, into which the lyophilized bacterial may be placed, and preferably suitably aliquoted. The kits of the present invention will also typically include a means for containing the lyophilized bacterial cultures, growth media and reagent containers in close confinement for commercial sale.

The use of bacteria which have been genetically modified in order to create iron-oxidizing or iron-reducing properties is contemplated by the present invention. Such genetic modifications may include inter alia recombinant DNA technologies such as stable transfection of a bacterial cell line with an expression vector containing the mRNA for a protein which catalyzes the reduction or oxidation of cationic iron or the introduction into a host cell genome the gene or genes responsible for the oxidation or reduction of cationic iron.

The present invention extends to computer software useful in controlling sequential or cycled wastewater treatments.

In one embodiment, an assessment system for the survival and growth of one or more specific bioredox microorganisms in a given wastewater sample may be useful for predicting and/or monitoring the capacity or extent of removal of one or more chemical species from the wastewater. Such an assessment is suitably facilitated with the assistance of a computer programmed with software, which inter alia adds index values ($I_v$) for one or more features associated with the presence of one or more types of bioredox microorganisms in order to provide a potency value ($P_A$) corresponding to the capacity of the bioredox microorganisms to create a given redox potential in a redox-mediator species.

Accordingly, the subject invention contemplates a computer program product for assessing the capacity and/or extent of removal of one or more chemical species, said product comprising:

(1) code that receives as input $I_v$ for one or more features associated with specific bioredox microorganisms, where said features are selected from:—
  (a) the presence of said bioredox microorganisms in a given sample;
  (b) the activity of said bioredox microorganisms in a given sample; or
  (c) the growth of said bioredox microorganisms in a given sample;
(2) code that adds said $I_v$ to provide a sum corresponding to a $P_v$ for one or more bioredox microorganisms; and
(3) a computer readable medium that stores the codes.

A version of these embodiments is a system which includes a computer comprising a central processing unit ("CPU"), a working memory which may be, e.g, RAM (random-access memory) or "core" memory, mass storage memory (such as one or more disk drives or CD-ROM drives), one or more cathode-ray tube ("CRT") display terminals, one or more keyboards, one or more input lines, and one or more output lines, all of which are interconnected by a conventional bidirectional system bus.

Input hardware, coupled to computer by input lines, may be implemented in a variety of ways. For example, machine-readable data of this invention may be inputted via the use of a modem or modems connected by a telephone line or dedicated data line. Alternatively or additionally, the input hardware may comprise CD. Alternatively, ROM drives or disk drives in conjunction with display terminal and keyboard may also be used as an input device.

Output hardware, coupled to computer by output lines, may similarly be implemented by conventional devices. By way of example, output hardware may include CRT display terminal for displaying a quantitative representation of a bioredox microorganism as herein described. Output hardware might also include a printer, so that hard copy output may be produced, or a disk drive to store system output for later use.

The present invention is now described in relation to the one particularly preferred embodiment.

The anaerobic and/or aerobic treatment steps involved in removing or otherwise reducing the level of organic and/or inorganic contaminants in wastewater may be performed using a sequential or cycled processes. A cycled process is shown in FIG. 1A.

In such a system, all influent wastewater undergoes an initial aerobic treatment step within an aerobic treatment chamber wherein the wastewater is inoculated with an adequate amount of iron-oxidizing bacteria to oxidize cationic iron to the ferric state and promote the physico-chemical formation of insoluble particles of contaminants. The effluent from the aerobic treatment step is passed into a sequentially connected clarifier for bioremoval of organic compounds required for the growth of the microorganisms contained within the activated sludge of said clarifier. The effluent from the clarifier may then either pass back through the above-mentioned aerobic treatment step or travel into an anaerobic treatment chamber wherein the aerobically pre-treated and clarified wastewater is inoculated with an adequate amount of iron-reducing bacteria to reduce cationic iron to the ferrous state and promote the physico-chemical formation of insoluble particles of contaminants. The effluent from the anaerobic treatment step is fed into a clarifier which is in sequence with the anaerobic treatment chamber. The effluent from each of the two clarifiers may undergo repeated aerobic and anaerobic treatment steps.

A further embodiment of the present invention is shown in FIG. 1B. In this system, all influent wastewater undergoes and initial anaerobic treatment step in an anaerobic treatment chamber wherein the wastewater is inoculated with an adequate amount of iron-reducing bacteria to reduce cationic iron to the ferrous state and promote the physico-chemical formation of insoluble particles of contaminants. The effluent from the anaerobic treatment step is passed into a sequentially connected clarifier for bioremoval of organic compounds required for the growth of the microorganisms contained within the activated sludge of said clarifier. The effluent from the clarifier may then either pass back through the above-mentioned anaerobic treatment step or travel into an aerobic treatment chamber wherein the anaerobically pre-treated and clarified wastewater is inoculated with an adequate amount of iron-oxidizing bacteria to oxidize cationic iron to the ferric state and promote the physico-chemical formation of insoluble particles of contaminants. The effluent from the aerobic treatment step is fed into a clarifier which is in sequence with the aerobic treatment chamber. The effluent from each of the clarifiers may undergo repeated aerobic and anaerobic treatment steps.

Yet another embodiment is shown in FIG. 1C. In this system, influent wastewater undergoes and initial anaerobic treatment step wherein the wastewater is inoculated with an adequate amount of iron-reducing bacteria to reduce cationic iron to the ferrous state and promote the physico-chemical formation of insoluble particles of contaminants. The effluent from the anaerobic treatment step is passed into a sequentially connected clarifier for bioremoval of organic compounds required for the growth of the microorganisms contained within the activated sludge of the clarifier. The effluent from the clarifier then undergoes an aerobic treatment step wherein the anaerobically pre-treated and clarified wastewater is inoculated with an adequate amount of iron-oxidizing bacteria to oxidize cationic iron to the ferric state and promote the physico-chemical formation of insoluable particles of contaminants. The effluent from the aerobic treatment step is fed into a clarifier which is in sequence with the aerobic treatment chamber.

The present invention is further described by the following non-limiting Examples.

EXAMPLE 1

The Combined Anaerobic-Aerobic Treatment of Polluted Wastewater

Sequential anaerobic-aerobic wastewater treatments with and without an iron as an added redox mediator species were performed to compare the relative efficiency of each method in the treatment of wastewater. Experiments performed in the presence of added iron were inoculated with enriched cultures of iron-reducing and iron-oxidizing bacteria.

Anaerobic batch-processing was performed at 55° C. in 2 L and 5 L glass reactors which were placed in incubator. Anaerobic batch processing (initial pH 7.5) was initiated via inoculation of 20% v/v of the sludge from a municipal anaerobic digester. Effluent produced by anaerobic treatment steps was centrifuged and subsequently used for moderate-temperature aerobic processing after inoculation by 10% v/v of the activated aerobic sludge from a municipal wastewater treatment facility. The parameters of wastewater treatment were determined by Standard Methods for the Examination of Water and Wastewater. The number of sulfate-reducing bacteria in the anaerobic reactor was determined by most-probable-number method (MPN) in Baar's medium. Methanogens were quantified by detection of their auto-fluorescence using fluorescence microscope.

Wastewater Composition

To the wastewater was added a mixture of potato starch, 20 g/L; peptone, 19 g/L (or 3 g of nitrogen/L), ammonium sulfate 2.5 g/L; potassium dihydrophosphate, 1 g/L and calcium carbonate, 0.3 g/L (control). Ferric chloride, 27 g/L ($FeCl_3 \cdot 3H_2O$), and ferrous sulfate, 32 g/L ($FeSO4 \cdot 7H_2O$) in appropriate amounts to achieve a molar ratio of N:Fe of 1:1. Samples which were processed in the absence of these iron salts were designated "control" samples.

Effects of Iron on Biogas and Ammonium Production

The presence of ferric and ferrous salts in the anaerobic treatment reactor significantly increased gas production rate. The presence of iron also stimulated an ammonification in waste which contained organic nitrogen (Table 1).

TABLE 1

Parameters of anaerobic treatment

| Parameter | Average value* | |
|---|---|---|
| | Fe-Containing Batch | Control Batch |
| Cumulative gas production, L | 19.3 | 15.3 |
| Initial concentration of ferrous, g/L | 5.8 | <0.01 |
| Final concentration of ferrous, g/L | 4.3 | <0.01 |
| Initial concentration of ammonium, g $NH_4$—N/L | 0.4 | 0.4 |
| Final concentration of ammonium, g $NH_4$—N/L | 2.2 | 1.5 |

*Co-efficients of variation did not exceed 10% for the determination of gas production and 5% for the analysis of ferrous and ammonium.

The increase in gas production was a consequence of the inhibition of the growth of sulfate-reducing bacteria by the anaerobic iron-reducing bacteria, which compete for the electron donors that are required for growth of sulfate-reducing bacteria. Sulfate-reducing bacteria are producers of hydrogen sulfide, a compound which is a potent growth-inhibitor of methanogenic bacteria (i.e. bacteria which produce methane via methanogenesis). The increase in growth of methanogenic bacteria in the iron-supplemented samples is shown in Table 2.

TABLE 2

Influence of iron on the growth and activity of mehanogens and sulfate-reducing bacteria

| Parameter | Average value* | |
|---|---|---|
| | Fe-Containing Batch | Control Batch |
| Final number of methanogenic bacteria, $10^9$ cells/mL | 2.5 | 0.7 |

TABLE 2-continued

Influence of iron on the growth and activity
of mehanogens and sulfate-reducing bacteria

| | Average value* | |
|---|---|---|
| Parameter | Fe-Containing Batch | Control Batch |
| Final number of sulfate-reducing bacteria, cells/mL | $10^1$ | $10^8$ |
| Content of hydrogen sulfide in gas, vol. % | 0.8 | 8 |
| Content of carbon dioxide in gas, vol. % | 38 | 55 |

*Co-efficients of variation did not exceed 70% for the enumeration of bacteria and 10% for the determination of hydrogen sulfide and carbon dioxide in gas.

Effluent from anaerobic treatment was subsequently treated under aerobic conditions by aerobic activated sludge at 20° C. Data are shown in the Table 3.

TABLE 3

Effects of anaerobic followed by aerobic treatment

| Time of treatment | Average concentration*, mg/L | | | | | |
|---|---|---|---|---|---|---|
| | In experiment | | | In control | | |
| day | $Fe^{2+}$ | $NH_4^+$ | $NO_3^-$ | $Fe^{2+}$ | $NH_4^+$ | $NO_3^-$ |
| 0 | 3010 | 625 | 8 | 0 | 850 | 20 |
| 4 | 356 | 155 | 179 | 0 | 680 | 481 |
| 8 | 110 | 6 | 106 | 0 | 460 | 731 |
| 10 | 110 | 6 | 30 | 0 | 380 | 969 |

*Co-efficients of variations did not exceed 5% for the determination of Fe(II), ammonium and nitrate.

Ammonium Degradation and Nitrification

Ammonium, which is present in municipal, aquacultural, agricultural and several types of industrial wastewaters, is often a by-product of proteins and nucleic acids. Under aerobic conditions ammonium can be oxidized to nitrate (nitrification) by nitrifying bacteria, but these bacteria have a low growth rate and activity profile in the conditions required for wastewater treatment.

The addition of aerobic sludge which was adapted for the oxidation of iron(II) increased the rate of oxidation of ferrous iron to iron(III) 1.5-3.5 fold. Nitrification of ammonium was not observed in the experimental sample, and all ammonium present was quickly eliminated from the medium by the precipitation of iron hydroxides with ammonium. The mechanism of this precipitation is well-known in the art. Briefly, iron(II) oxidation to iron(III) promotes the formation of iron hydroxide anions such as $Fe(OH)_4^-$ and $Fe(OH)_5^-$. These anions precipitate with ammonium cations.

Chemical analysis of the iron and nitrogen removed from the experimental sample revealed the predominant iron-hydroxide-ammonium form was $NH_4Fe(OH)_4$.

Ordinary nitrification was in the control.

Aerobic Oxidation in the Absence of Iron-Oxidizing Bacteria

Experimental samples processed without the addition of iron-oxidizing bacteria (in the presence of ferrous lactate, 9 g/L) displayed a rate of chemical oxidation 25-times lower than that observed in the presence of iron-oxidizing bacteria (Table 4). The concentration of total nitrogen in the iron-containing precipitate was 9.4% w/w.

TABLE 4

Biological and chemical formation of
iron hydroxide from ferrous lactate

| Time of treatment | Average concentration*, mg/L | |
|---|---|---|
| h | Experiment | Control |
| 3 | 220 | 40 |
| 24 | 224 | 46 |
| 48 | 408 | 116 |
| 96 | 9390 | 376 |

*Co-efficient of variation did not exceed 5% for the determination of iron hydroxide; experiment is an oxidation of ferrous lactate in the presence of activated sludge; control is chemical oxidation of ferrous lactate by aeration.

Figure 2:
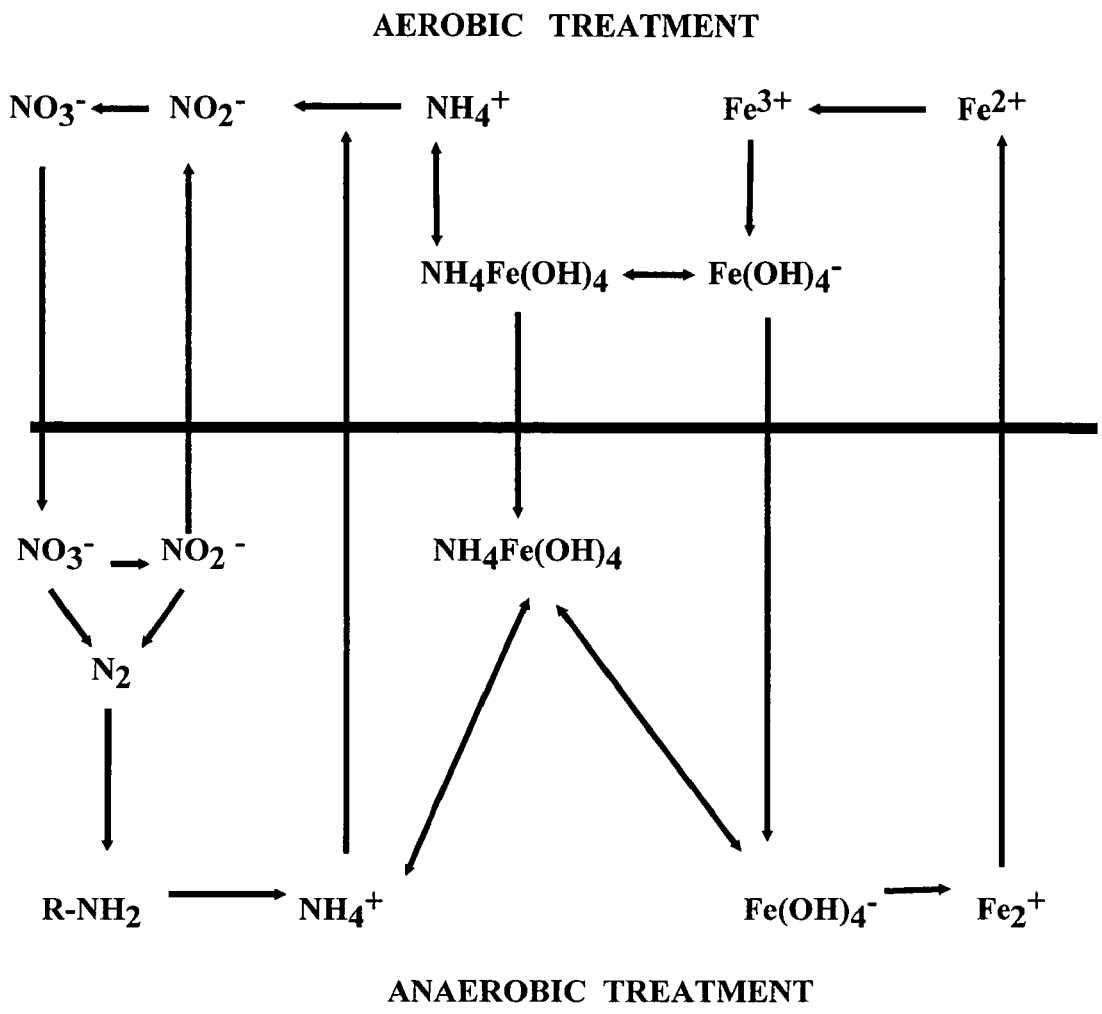
FIG. 2 is an outline of the biotransformation processes involving iron and nitrogen in combined anaerobic-aerobic treatments of wastewater.

The results of these experiments thus indicate that the bioremoval of ammonium as iron hydroxide-ammonium precipitants is an extremely effective method for the removal of ammonium from wastewater. The interactions of iron and nitrogen transformations are shown in FIG. 2.

EXAMPLE 2

The Effects of Additional Iron Salts on Anaerobic Fermentation of Lipid-Rich Wastewater The utility of adding iron to anaerobic treatment of lipid-rich wastewater was examined. Experiments were performed to compare anaerobic fermentation between inoculum and ferrous oleate (experimental sample); inoculum only (control 1) and inoculum with sodium oleate (control 2).

The results of this study are shown in Table 5. The addition of iron salts in the form of ferrous oleate caused a significant increase in gas production.

The increased gas production was a consequence of the presence of ferrous oleate, which supports the growth of methanogenic bacteria. These methanogens use ferrous oleate as a substrate for methanogenesis (Tables 5 and 6). The sodium oleate which was added in control 2 is soluble and is not a significant substrate for methanogenesis, hence, does not support the growth of methanogens.

TABLE 5

Cumulative production of gas during anaerobic
digestion of long-chain fatty acid (litres)

| Time of cultivation | Average value* | | |
|---|---|---|---|
| day | Experiment | Control 1 | Control 2 |
| 2 | 2.0 | 0.5 | 0.2 |
| 4 | 4.1 | 1.1 | 0.3 |
| 6 | 6.9 | 1.8 | 0.5 |
| 8 | 13.5 | 2.0 | 1.7 |

*Co-efficient of variation did not exceed 10% for the determination of biogas production; experiment was the anaerobic fermentation with inoculum and ferrous oleate as the carbon sources; control 1 was the fermentation of inoculum as sole carbon source; and control 2 was the fermentation with the inoculum and sodium oleate as carbon sources.

TABLE 6

Growth of methanogenic bacteria during anaerobic digestion of long-chain fatty acid

| Time of cultivation | Average value*, $10^8$ cells/mL | | |
|---|---|---|---|
| day | Experiment | Control 1 | Control 2 |
| 1 | 76 | 43 | 23 |
| 4 | 98 | 14 | n.d. |
| 6 | 152 | 5 | 37 |
| 9 | 224 | 1 | 32 |

*Co-efficient of variation did not exceed 70% for the enumeration of bacteria; experiment, controls 1, 2 and 3 were same ones as shown in the Table 5. n.d. means that the data were not determined.

EXAMPLE 3

Comparative Profiles of Different Iron Sources in the Anaerobic Treatment of Wastewater Comparative Reduction Rates of Different Forms of Iron Iron(III) reduction rates following the addition of either iron hydroxide, iron ore or iron-containing clay were measured.

The average rate of iron(II) production from iron(III) by anaerobic sludge which was not inoculated with iron-reducing bacteria was 10 mg Fe(II)/L/day for iron hydroxide, 2.5 mg Fe(II)/L/day for iron ore, 5 mg Fe(II)/L/day for iron-containing clay (Table 7).

TABLE 7

Comparative reduction rates for different iron sources in inoculated and non-inoculated sludge

| Source of Iron | Reduction Rate, Non-Inoculated Sludge (L/day) | Reduction rate, Inoculated Sludge (L/day) |
|---|---|---|
| Iron hydroxide | 10 | 25 |
| Iron ore | 2.5 | 9 |
| Iron-containing clay | 5 | 19 |

Effect of Iron and Iron-Reducing Bacteria on Start-Up and Reductive Reaction Rates The use of inoculated anaerobic sludge (i.e. enriched with iron-reducing bacteria) decreased the start-up period of the anaerobic reduction reactions by 3-7 days and increased the rate at which reduction reactions occurred by 1.5-3.7 times, depending on the specific reduction reaction examined.

Special Requirements and Observations Relating to Iron-Containing Clay

Figure 3:
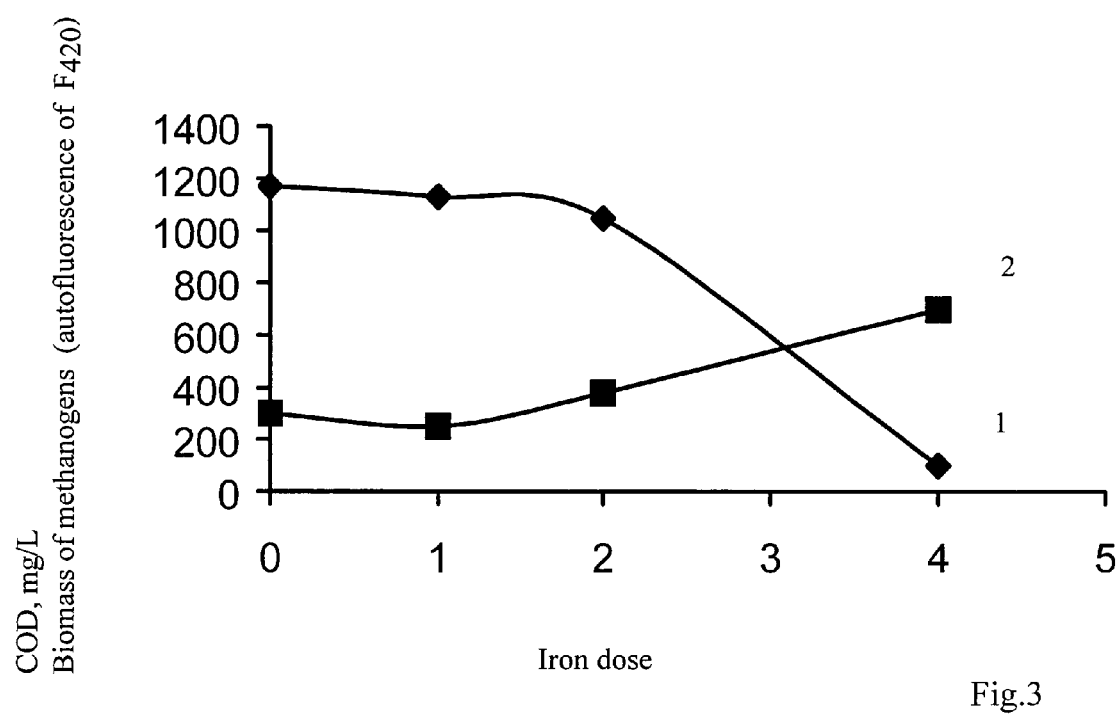
FIG. 3 represents the influence of iron on final chemical oxygen demands (COD) (1) and biomass of methanogens (2).

The efficacy of the iron-containing clay was sub-optimal in the treatment of lipid-rich wastewater when the stoichiometric ratio of iron(III) to oleic acid salts was less than twor (FIG. 3).

The biomass of methanogenic bacteria performing final stage of anaerobic treatment was found to be three times more than without addition of iron-containing clay in the wastewater and final chemical oxygen demand (COD) was lower than permissible level for the effluents of wastewater treatment plants (100 mg/L).

EXAMPLE 4

Anaerobic Digestion of Excess Aerobic Sludge

The anaerobic reactors used to digest aerobic sludge were inoculated by anaerobic sludge from a municipal wastewater treatment plant and incubated under anaerobic conditions for 16 days. Either iron hydroxide or iron-containing clay was used in the experimental sample (total concentration of iron was 3.1 g/L) and the control sample was without additional iron.

Comparative Reduction Rates and Chemical Oxygen Demands for Experimental and Control Samples The average rate of iron(II) production during anaerobic digestion of the activated sludge was 82.3 mg Fe(II)/L/day for iron hydroxide, and 19.7 mg Fe(II)/L/day for iron-containing clay. The final chemical oxygen demand (COD) for the control sample (no addition of iron source) was significantly higher than the final COD for the experimental samples.

The addition of iron(III) to the anaerobic digestion of aerobic sludge reduced the COD to a level which was lower than permissible for the effluent of wastewater treatment plants (100 mg/L). The use of anaerobic sludge, which was adapted for the reduction of iron in iron-containing clay (enrichment culture of iron-reducing bacteria), decreases the start-up period of the process for 1-2 days and increased the rate of reduction 1.5-2.4 times.

EXAMPLE 5

Anaerobic Digestion of Liquid or Suspended Solid Waste in an Open-Air Reactor

The content of iron-containing clay in an open-air anaerobic digester must be 20-800 g of dry matter/L to diminish the diffusion of oxygen into the depth of reactor, and thus ensure the anaerobic conditions in the reactor. This high content of iron not only ensures anaerobic conditions and the reduction of iron but also the complete reaction and subsequent removal of dissolved Fe(II) with dihydrogen sulfide and organic acids. This prevents the release of toxic and malodorous substances from the reactor.

The use of these high concentrations of iron in an open-air reactor in the presence of anaerobic sludge (containing iron-reducing bacteria) decreased the start-up period of the process by 4-7 days and increased the rate of reduction by 1.3-4.6 times, depending on the chemical reaction process examined.

EXAMPLE 6

Combined Anaerobic-Aerobic Treatment of Municipal Wastewater

Aerobic treatment of wastewater was performed after mixing of the liquid from the anaerobic digester. The liquid from anaerobic digester contained 0.2-20 g N—$NH_4$/L and 1-100 g Fe(II)/L. Iron, in the form of iron-containing clay or crushed iron ore, was added to the anaerobic reactor in a concentration range 1.1-10 times higher than the concentration of nitrogen in the wastewater to ensure the adequate precipitation of ammonium with iron hydroxides.

Ammonium was produced from chemical reactions involving proteins and nucleic acids in the anaerobic digester.

This form of anaerobic sludge, which was adapted for the reduction of iron (enrichment culture of iron-reducing bacteria) was employed in the treatment of municipal wastewater. Our results showed that the adapted sludge decreased the start-up period of the anaerobic treatment of municipal wastewater by 2-5 days and increased the rate of reduction 1.1-2.8 times.

Iron(II) and its chelates were subsequently oxidized in the aerobic reactor, forming insoluble iron hydroxides which precipitate ammonium. The use of such inoculate as aerobic sludge, which was adapted for the oxidation of iron(II) chelates (enrichment culture of iron-oxidizing bacteria), decreased the start-up period of the aerobic processes in municipal wastewater treatment by 1-3 days and increased the rate of oxidation to 1.3-3.9 times.

Iron-ammonium precipitates were removed in clarifier for use in agricultural applications as nitrogen fertilizers.

EXAMPLE 7

The Removal of Ammonium from Aquacultural Wastewater

Freshwater used in the aquaculture of shrimps was treated in aerobic biofilters. The biofilters comprised plastic columns filled with screened particles of the crushed shells covered by bacterial biofilm formed during long-term ($\geq$10 days) filtration of aquacultural water. Fresh aerated water contained 7.5 mg of ammonium/L and 15 mg of Fe(II)/L (in experimental samples only).

Fe(II) was produced in a prior anaerobic digestion reaction where the source of iron was iron-containing clay and the source of carbon for the reduction of Fe(II) was organic semi-liquid waste (fecal material was used in the this experiment). Excess shrimp-feed was removed from aquacultural water by a clarifier.

The required concentration of Fe(III) in the aerobic digester was found to be 1.5-10 times higher than the corresponding levels of nitrogen in the aquacultural water. Liquid from the anaerobic digester was mixed with fresh water in ratio 1:20-1:1000 before the biofiltration process. This mixture was percolated through the biofilter with a flow rate which enable a hydraulic retention time (HRT) of 10 min to 100 hours.

In the absence of Fe(II), extensive nitrification occurred during biofiltration. In the presence of Fe(II), however, nitrification was not observed and all ammonium was removed from the aquaculture wastewater. This was a consequence of the precipitation of ammonium cations following ionic interaction with anionic iron hydroxides which form under oxidative aerobic conditions. The molar ratio of ammonium and iron in the formed precipitant was approximately 1.1.

This method provides and efficient means for the removal of ammonium from aquacultural water, thus preventing the toxic effects of this chemical in the marine environment.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

The invention claimed is:

1. A method for reducing a level of certain chemical compounds in a sample, said method comprising subjecting said sample to at least one of an anaerobic treatment and an aerobic treatment wherein a valency of one or more redox mediator species is manipulated by encapsulated microorganisms such that, under anaerobic conditions, the one or more redox mediator species are reduced to a lower order valency, and under aerobic conditions, the redox mediator species are oxidized to a higher order valency, and wherein formation of insoluble particles comprising the chemical compounds is facilitated.

2. The method of claim 1 wherein the chemical compounds comprise inorganic molecules.

3. The method of claim 1 wherein the chemical compounds comprise organic molecules.

4. The method of claim 1 wherein the chemical compounds comprise one or more of proteins, fatty acids, lipids, ammonium, organic acids, phenolic compounds, aromatic polycyclic oxygenated compounds, nucleic acids, sulfates, phosphates, radionuclides and cyanides.

5. The method of claim 1 wherein the sample is liquid, semi-liquid, solid, particulate or gaseous or a mixture thereof.

6. The method of claim 5 wherein the sample is an environmental, industrial or domestic sample.

7. The method of claim 1 wherein the sample is wastewater, water, solid waste, or polluted soil.

8. The method of claim 1 wherein the redox mediator species are selected from the group consisting of zero valence metal species, metallic ions, metal-containing oxides, hydroxides, chelates, non-biodegradable and insoluble inorganic constituents with variable oxidation-reduction states, or a combination thereof.

9. The method of claim 8 wherein the metallic and metal-containing species are selected from the group consisting of iron, nickel, cobalt, manganese, vanadium and combinations thereof.

10. The method of claim 8 wherein the cationic metal is provided as metal salts or metal slurry.

11. The method of claim 8 wherein the microorganisms are iron-reducing microorganisms selected from the genera consisting of: *Acidobacterium, Aerobacter, Bacillus, Clostridium, Deferribacter, Desulfuromonas, Desulfuromusa, Esherichia, Ferribacterium, Ferrimonas, Geobacter, Geovibrio, Geothrix, Pantoea, Pseudomonas, Sulfurospirillum, Shewanella, Thermoterrabacterium, Thermotoga*, and *Thermus*, or a mixed culture thereof, or an enrichment culture of microorganisms capable of reducing iron (III).

12. The method of claim 8 wherein the microorganisms are iron-oxidizing microorganisms selected from the genera consisting of *Acidianus, Acidithiobacillus, Ferroglobus, Ferromicrobium, Gallionella, Hyphomicrobum, Leptothrix, Naumanniella, Ochrobium, Leptospirillum, Pedomicrobium, Rhodovulum, Rhodocyclus, Siderococcus, Sphaerotilus, Siderocapsa, Sulfolobus, Stenotrophomonas*, and *Thiobacillus*, or a mixed culture of aforementioned microorganisms, or an enrichment culture of the microorganisms capable of oxidizing iron (II).

13. A method for reducing a level of a chemical compound in one or more of wastewater, surface water, ground water, solid waste, and polluted soil, said method comprising subjecting said wastewater, surface water, ground water, solid waste, or polluted soil to one or more of anaerobic treatment and aerobic treatment wherein a valency of one or more cationic iron species is manipulated by encapsulated microorganisms, wherein under anaerobic conditions, cationic iron species are reduced to a lower order valency, and under aerobic conditions, cationic iron species are oxidized to a higher order valency by said microorganisms, and the formation of insoluble particles comprising the chemical compound is facilitated.

14. A method for reducing a level of one or more chemicals in a waste sample, said method comprising (1) introducing to said waste sample one or more cationic iron species, and (2) subjecting said waste sample to one or both of anaerobic treatment and aerobic treatment, wherein the valency of one or more cationic iron species is changed by encapsulated microorganisms where under anaerobic conditions, the cationic iron species are reduced to a lower order valency, wherein under aerobic conditions, the cationic iron species are oxidized to a higher order valency, and wherein the formation of insoluble particles comprising the one or more chemicals to be removed is facilitated.

15. The method according to claim 14, wherein the waste sample is wastewater, surface water, ground water, solid waste, or polluted soil.

16. The method according to claim 14, wherein the waste sample is subject to a cycled aerobic-anaerobic treatment scheme.

17. The method according to claim 14, wherein the waste sample is subject to a cycled anaerobic-aerobic treatment scheme.

18. The method according to claim 14, wherein the waste sample is subject to a sequential aerobic-anaerobic treatment scheme.

19. The method according to claim 14, wherein the chemical to be removed is ammonium.

20. The method according to claim 14, wherein the cationic iron species comprise a ferrous salt or a ferric salt.

21. The method according to claim 14, wherein the cationic iron species comprises iron ore or iron slurry.

22. The method according to claim 14, wherein the microorganisms are introduced as activated sludge.

23. A composition for removing or otherwise reducing the level of inorganic or organic chemicals in an waste sample, comprising one or more aerobic or anaerobic iron-reducing microorganisms and a cationic iron compound, wherein the microorganisms are encapsulated within the cationic iron compound.

24. A method for assessing the capacity of a system for removing one or more chemicals from a waste sample, wherein the system comprises ironic cation compounds and bioredox microorganisms that are capable of modulating the redox potential of the ironic cation compounds, the method comprising: (1) establishing at least one index value $I_v$ for at least one feature associated with bioredox microorganisms present in the system, and (2) establishing from Iv at least one potency value Pv corresponding to the capacity of the bioredox microorganisms to establish a given redox potential for the iron cation compound.

* * * * *